J. H. LEVERING
EXTERNALLY REENFORCED CONSTRUCTION
June 16, 1931. Re. 18,104
Original Filed June 7, 1919 6 Sheets-Sheet 1
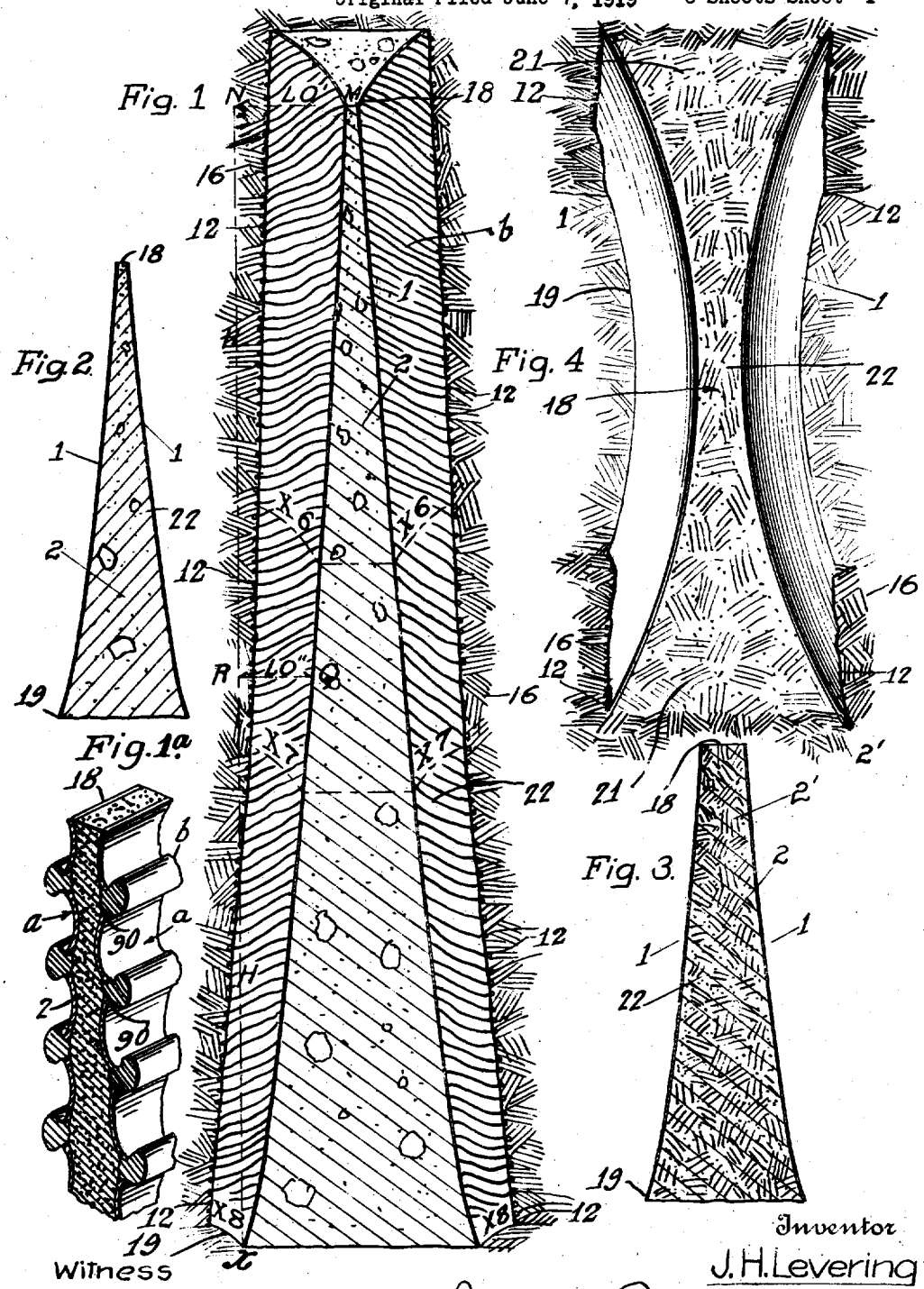
Witness
W. K. Levering
Inventor
J. H. Levering
By James R. Townsend
his Attorney J. H. LEVERING
EXTERNALLY REENFORCED CONSTRUCTION
June 16, 1931.
Re. 18,104
Original Filed June 7, 1919. 6 Sheets-Sheet 2
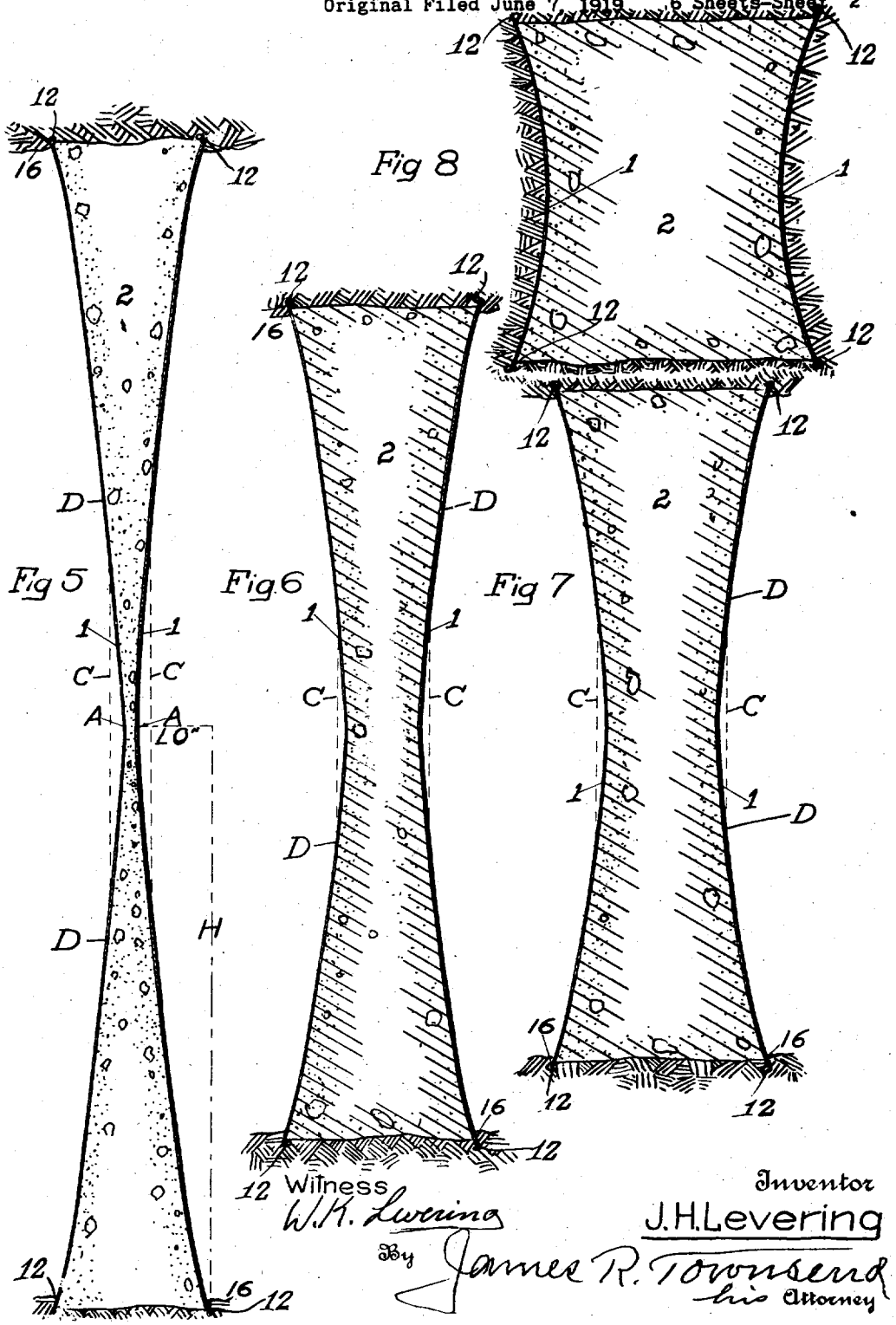
Witness
W. K. Levering
Inventor
J. H. Levering
By James R. Townsend
his Attorney J. H. LEVERING
EXTERNALLY REENFORCED CONSTRUCTION
June 16, 1931.
Re. 18,104
Original Filed June 7, 1919
6 Sheets-Sheet 3
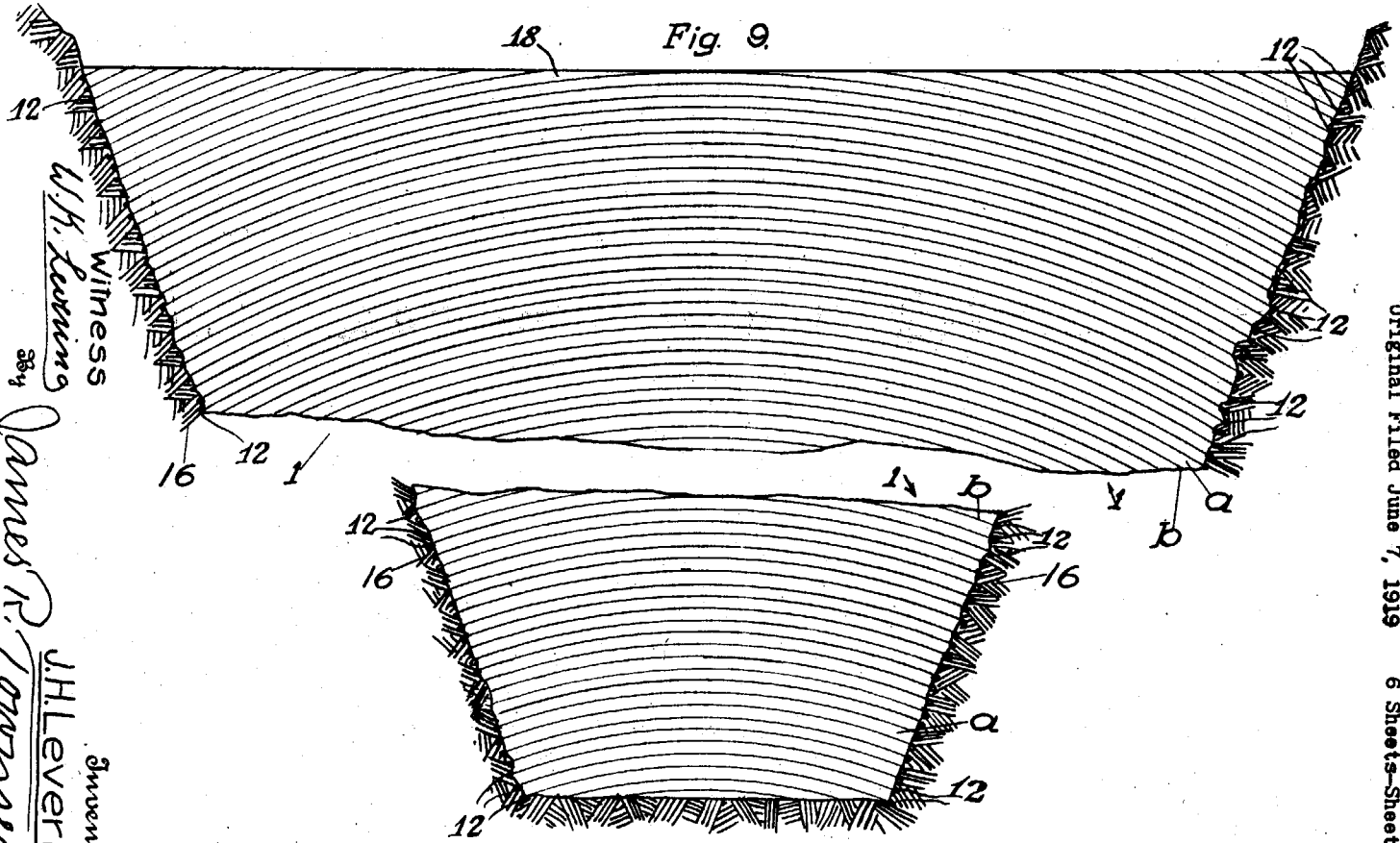
Witness
W. K. Levering
Inventor
J. H. Levering
By James R. Townsend
his Attorney

J. H. LEVERING
EXTERNALLY REENFORCED CONSTRUCTION

June 16, 1931. Re. 18,104

Original Filed June 7, 1919 6 Sheets-Sheet 4

Witness
W.K. Levering

Inventor
J.H. Levering

By James R. Townsend
his Attorney

J. H. LEVERING
EXTERNALLY REENFORCED CONSTRUCTION

June 16, 1931. Re. 18,104

Original Filed June 7, 1919 6 Sheets-Sheet 5

Witness
W. K. Levering

Inventor
J. H. Levering
By James R. Townsend
his Attorney

J. H. LEVERING
EXTERNALLY REENFORCED CONSTRUCTION

June 16, 1931. Original Filed June 7, 1919 Re. 18,104
6 Sheets-Sheet 6

Witness
W. K. Levering

Inventor
J. H. Levering

By James R. Townsend
his Attorney

Reissued June 16, 1931

Re. 18,104

UNITED STATES PATENT OFFICE

JAMES HENRY LEVERING, OF LOS ANGELES, CALIFORNIA

EXTERNALLY-REENFORCED CONSTRUCTION

Original No. 1,643,275, dated September 20, 1927, Serial No. 302,470, filed June 7, 1919. Application for reissue filed September 19, 1929. Serial No. 393,784.

This invention and discovery pertains to the engineering art and particularly relates to the art of constructing dams for impounding or diverting waters for the purpose of conserving such waters and developing hydraulic power. It is also applicable to bridges and other structures.

An object of this invention is to provide a practical dam by means of which it is made possible to safely dam any water channel or chasm, as for instance, the chasm of the Colorado River within the Grand Canyon of the Colorado, and to extend such dam, with practical ease and perfect safety, to any desirable height; say for example, 1200 feet more or less.

A dam for this purpose requires great strength and durability to prevent fractures which may be caused by vibrations or stresses; also to prevent destruction or damage from seismotic action or other movements.

Another object is to avoid all danger of vibrations from overflow without constructing a separate spill-way.

Other objects are low cost and high speed of construction.

Another object is to prevent deterioration from the action of the elements.

Another object is to eliminate the necessity of raising scaffolding, forms or supports during construction.

This dam comprises a metal mono-plate face on a supporting element, such as a filling, backing or core. That is to say, I apply to a filling, backing or core of concrete, or some suitable substitute therefor, a plate which is inherently integral throughout an entire active face of the dam. Said plate is practicable in the present state of the engineering art if constructed of pieces manufactured at the mill and welded together in situ at the dam.

It is important that said plate be so constructed and applied as to answer all conditions of temperature and climatic changes. An object is to take care of these requirements.

A feature of the invention resides in the peculiar construction of the facing-plate with transverse grooves and ribs which serve, in a novel and improved manner, several useful purposes, amongst which may be mentioned superior strength of plate and of the backing conformed thereto; superior adhesion to the backing; adaptability to carry the superimposed weight, as well as its own weight on the side walls or side footings instead of upon the base, which is thus relieved from gravity stresses that otherwise would be imposed upon it. This is especially true with the use of a concrete core because there is thus formed, by the plate and core, a composite unit having a greater strength and stiffness than would result from any other disposition of the same material for a like purpose.

Another advantage arising from this transversely ribbed or grooved construction as applied to the down-stream face of the dam, is the baffling and dissipating of any overflow that may occur; and this obviates the necessity of a water cushion at the foot of the dam.

Another feature is the construction of the mono-plate by means of oblique-arch ribs, which are welded to curved bonding plates to form therewith a single continuous unitary armor plate extending in complex arch form from wall to wall of the channel and from bottom to top of the dam.

Another feature of the invention is the construction of the dam upon the principle of an abutment and arch combined, so that the structure from wall to wall of the chasm or channel and from base to crest of the dam is at every point held in position by top, bottom and lateral abutments so that no local movement can occur.

Another feature resides in the novel combination of face plates and filling, backing or core which results from the peculiar curves and shapes of the face plate or plates and the backing or core conformed thereto. This is especially marked in the concrete construction where there is mounted on a face of the concrete core, and in combination therewith, an external armor plate having arched corrugations that are embedded in channel-like seats in the face of the core, and affording a confining reenforcement for the core, which reenforcement is bonded with the core and is practically a unit therewith. In this connection, however, it is noted that by my novel construction of the dam, a fractured or pulverized core would be held in position by the integral plates on the up-stream side and the down-stream side, respectively, of the dam; so that it is practical to construct a dam with a gravel, a sand or an earth filling or core between said up-stream and down-stream plates, it being understood that the thickness of the core must be in correlation to the character of the material of which the core is made.

Another feature of this invention depends upon the principle governing the contour of a vertical cross-section of the dam. I have discovered that by so constructing the dam that the general outline of the up-stream and also the down-stream face of the dam is, at any vertical cross-section, from base to crest in the form of a spiral curve in which the abscissa is equal to two-thirds power of the ordinate ($LO'=NX^{2/3}$), maximum resistance is developed. By constructing the dam according to this formula the weight of the metal skin of the up-stream or down-stream face of the dam is so imposed upon the filling or core as to hold the material of the core whether of clay, gravel, broken stone or concrete in place by gravity and yet to resist the up-lifting force of any seepage water that might, perchance, percolate in through the core.

Said principle of contour construction is also applied to the horizontal section of the dam on both the up and down-stream faces thereof, except that the horizontal sectional contour at any level is composed of two spirals, the apexes of which unite at the middle of the dam. The base and ends of a dam of given volume and material constructed between spiral contours in its vertical and horizontal sections, will have a larger surface in contact with the floor and walls of the chasm than is possible with former constructions. This greater contact area greatly increases the efficiency of the dam as a water seal, and the large adhesion and friction area thus provided, greatly increases the stability of the structure by forming an impervious barrier to prevent seepage of water thereunder to undermine the dam.

The principle of construction in the preferred form of this dam is that the pripcipal and also the subordinate curves of the armor plate or plates are all concave externally and convex toward the filling, backing or core. In consequence of this novel construction, the effect of both expansion of the metal armor by heat, and its contraction by cold, is to increase the frictional contact or adhesive bond between the plate and the core.

Another feature of the invention in its perfected form, is the presentation to the confined waters, of a surface which will break up and dissipate any wave or surge action caused superficially or otherwise, by wind or other forces. This is effected by the arch rib and concave plate construction set forth in the foregoing and the following description.

The invention not only includes the structure as a whole, but also includes the specific parts constructed at the mill for this purpose; and includes the use of a specific construction of armor plate. In this connection it is noted that in dams of considerable height or length the armor may be steel plates having a thickness of about one inch, more or less, according to the requirements which will be well understood by engineers in view of this disclosure.

My improvement in the engineering art involves the discovery that a dam having an extreme coefficient of safety may be constructed by manufacturing at a mill, pieces of metal adapted to form a face for the dam, and then welding such pieces together in situ on the face of the dam, thus forming the face of the dam of an inherently integral piece. The invention also includes the specific construction of the mill-pieces adapted to the construction of the dam as herein set forth.

An object is to provide a construction that will invest the dam with an anchor system for securing the face plate and the core or backing positively together and to distribute the load throughout the structure in such a manner that there will not be any accumulated load upon any footing or other local portion of the structure.

Other objects, advantages and features of invention may appear from the accompanying drawings, the subjoined detail description and the appended claims.

The invention and discovery may be understood by reference to the accompanying drawings.

Figure 1 is a view adapted to illustrate the proportions of the dam and the general lines of a vertical section of said dam taken mid-way between the side walls of the chasm across which the dam is built. The elevational proportions shown in this view are those adapted to the construction of a dam twelve hundred feet high, and two hundred feet at the base. The lines on the up-stream and down-stream faces of the dam are intended to indicate the corrugations or ribs thereon, but it must be understood that from the nature of the views it is impossible to show the spacing, proportions, form or construction of said ribs as they would be microscopic upon the scale of the figures. The plane of sight is slightly above the crest of the dam so that the level crest of the dam appears in this view to slope upward away from the middle section of the dam; it is preferably level as seen in Fig. 9.

Fig. $1^a$ is a perspective fragmental view of the dam at the crest and indicates in a general way the outlines of the faces of the dam which it is impossible to show in Figs. 1, 2, 3.

Fig. 2 is a view analogous to Fig. 1 of a dam in proportions for four hundred feet height.

Fig. 3 is a view analogous to Figs. 1 and 2 showing in general outline a mid-cross section of an earth filled dam. In this view as in Fig. 2 no attempt is made to show the corrugations on the faces of the dam.

Fig. 4 is a plan of the dam indicated in Fig. 3.

Fig. 5 is a top plan of the dam indicated in Fig. 1.

Figs. 6, 7 and 8 are plan sections on lines indicated at $x^6$, $x^7$, and $x^8$ respectively Fig. 1.

Fig. 9 is a fragmental face elevation of the dam corresponding to that indicated in Figs. 1, 5, 6, 7 and 8. The parallel lines indicate the ribbed or corrugated surface of the armor and are spaced apart in exaggerated proportions to avoid confusion of lines and the footings are indicated by dots at the ends of said lines.

Referring first to the construction having a concrete filling or core as shown in Figs. 1, 5, 6, 7, 8, 9 and 10, the metal armor face plate 1 may be constructed of panels or strakes *a* and ribs or girder-beams *b* made up respectively of plate-like mill lengths or sections *c* acting as bonding members and beam-like mill lengths or sections *d*, (Figs. 10–13) integrally united in situ by any well-known process of welding as by flame or by electricity.

In Figs. 10, 16, 17 and 18, splice bars *e* are shown for use in uniting the ends of the mill length plate sections. Said splice bars may or may not be constructed with anchor devices and in Fig. 17 a splice bar *e* having an anchor is shown in cross-section with the ends of two plate-like mill lengths *c* in plan section, laid in the channels 3 of said bar, ready for electrical or flame welding to the splice bar.

Figure 10:
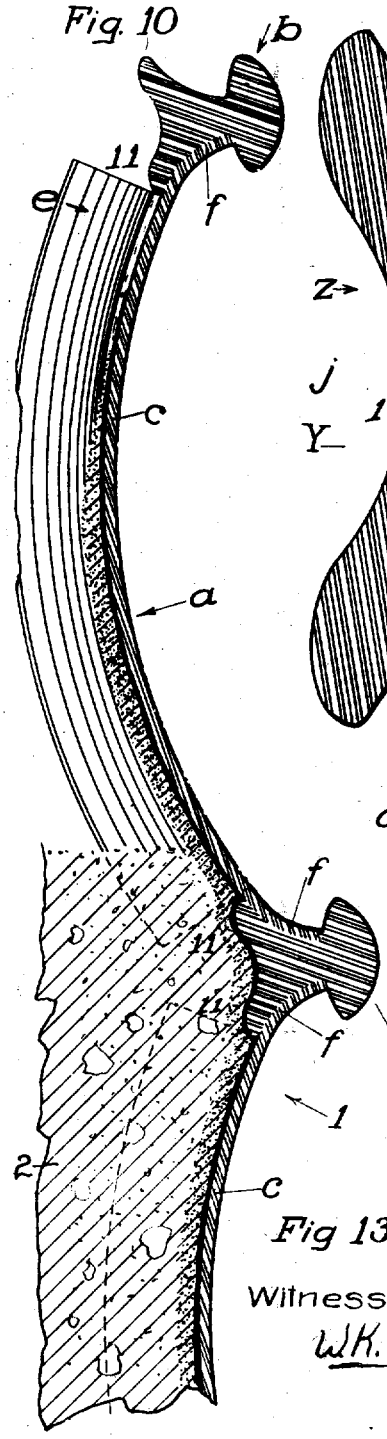
Fig. 10 is a fragmental vertical cross-section on a larger scale than the preceding views, showing an upper part of an uncompleted mono-plate double-armored concrete-filled dam in course of construction, a fragment of only one armor-plate being shown.
Figure 16:
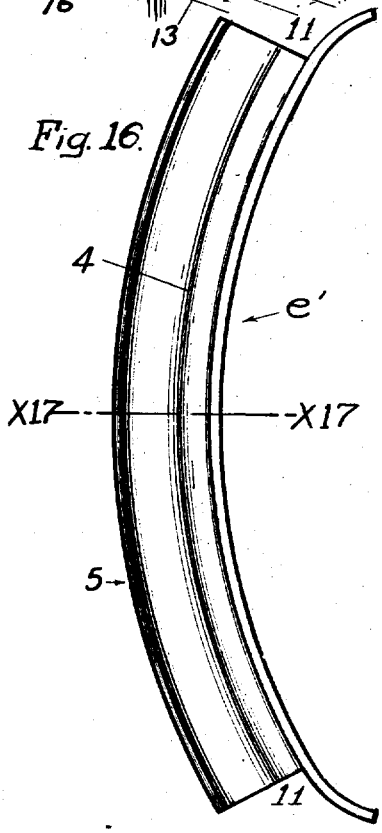
Fig. 16 is an elevation, detached, of an anchoring splice bar, which is shown partly in solid and partly in dotted lines in Fig. 10.
Figure 17:
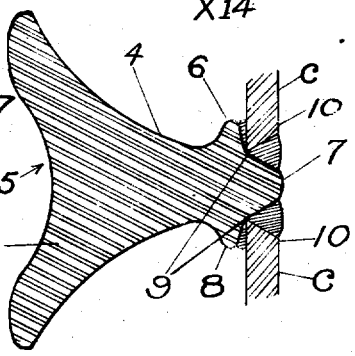
Fig. 17 is a cross-section on line $x^{17}$, Fig. 16.
Figure 18:
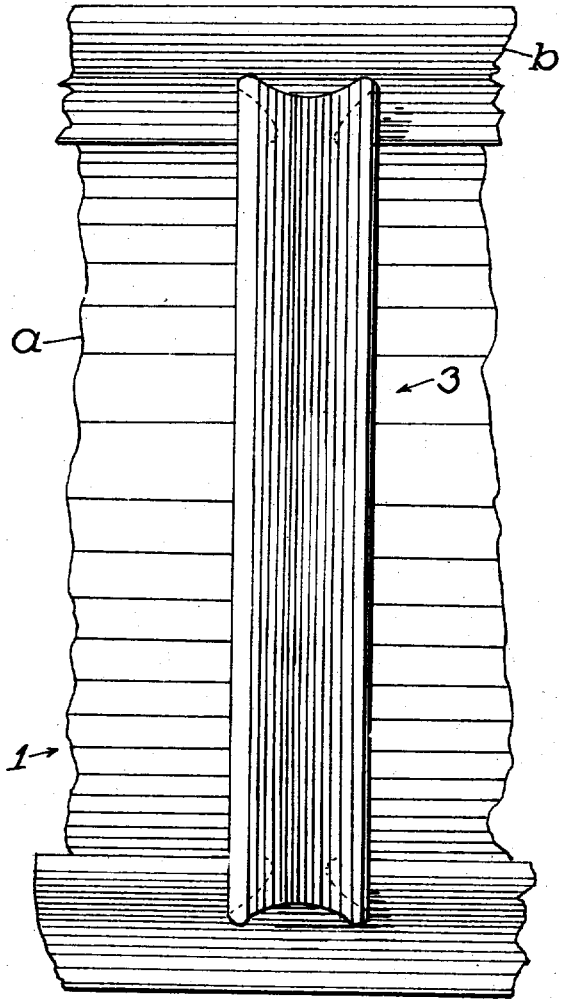
Fig. 18 is a fragmental elevation of that surface of the face plate which is next to the core of the dam.

The anchors of the splice bars are shown in Figs. 10, 16 and 17. The plate-like mill lengths *c* may be formed at the mill or place of manufacture to conform to its place in the completed structure. Preferably the core or backing 2, is faced on the up-stream side and also upon the down-stream side by face-plates of the same character.

As shown in Figs. 1, 2 and 3 these face-plates are constructed to a contour, vertically from the base to the crest at the mid-plane and throughout the vertical cross section of uniform height, respectively conforming, to spirals projected in accordance with the formula ($LO' = NX^{2/3}$); in which the abscissa from the base to the crest at such vertical cross sections is equal to two-thirds power of the ordinate of the height, that is in which the length LO′, of the ordinate of departure horizontally from the face of the dam is equal to the two-third power of the distance H from the base of the dam to the intersection of the line with ordinate LO′ of the curve.

In like manner the face plates are constructed along the crest and along horizontal cross sections of equal lengths, from mid-plane to abutment, to spirals projected in accordance with the formula above stated.

For illustration, in Fig. 1, assuming the height to be 1000 feet, LO′ is the ordinate at the one thousand foot height, M is the terminal of the ordinate and N is the point of intersection. M—N is equal to $1000^{2/3}$ viz; 100 ft. At the five hundred foot ordinate LO″, Q is the terminal and R the point of intersection with the curve. Q—R is equal to the two-third power of 500; i. e., $500^{2/3}$. In Figs. 5, 6, 7 and 8, the bases B, of the horizontal spirals are at the points respectively, of the intersection of the spiral with the supporting wall; and the apex A, is at the center of the structure. In Fig. 5 the length of the central ordinate of departure LO″ is equal to the two-third power of 525; the chasm being 1050 feet wide at the top or crest 18 of the dam.

It is thus seen that the dam in the preferred form consists of a core thicker at the base 19 or abutment 20 than at the crest 18 and also thicker at its abutment's lateral terminals 21 than at the thinnest middle or key 22.

Figure 11:
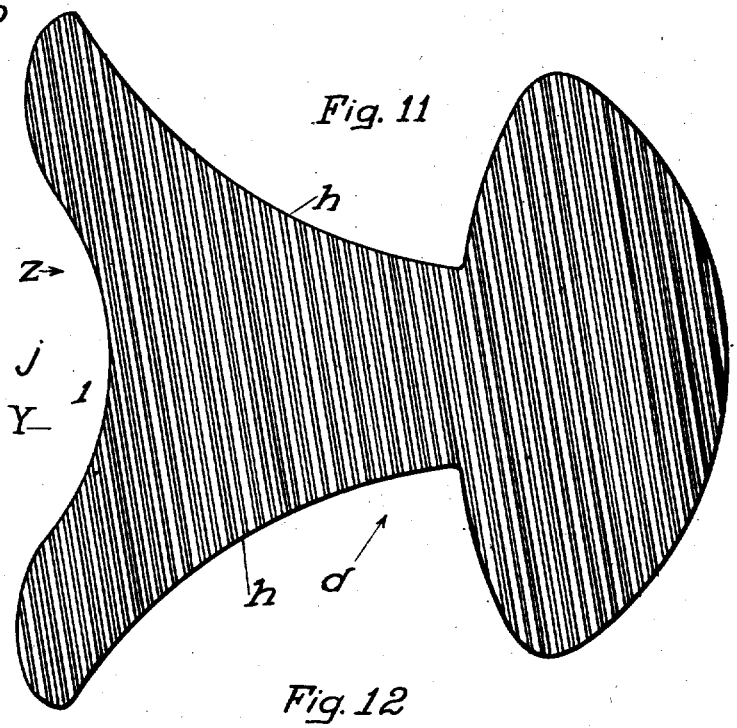
Fig. 11 is a transverse section of one of the rib-forming girder-beams detached and on a scale larger than that of Fig. 10.
Figure 12:
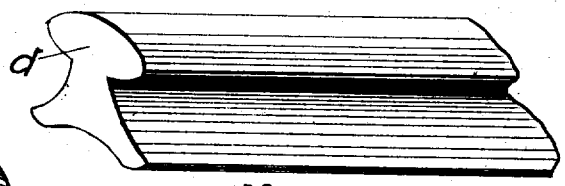
Fig. 12 is an isometric view of an end of one of the beam-like mill-length sections adapted to the construction of the girder-beams at the dam.
Figure 13:
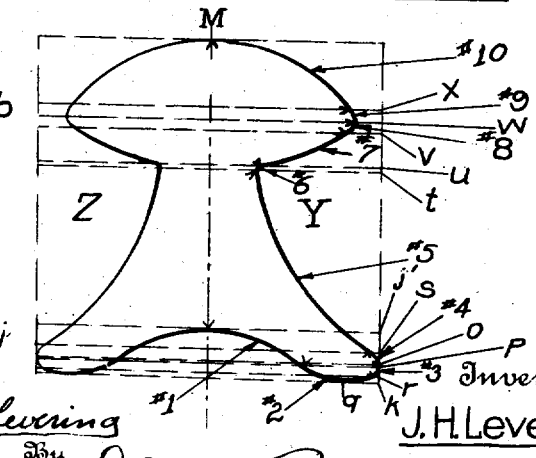
Fig. 13 is a diagrammatic end plot of the form of girder-beam mill length shown in Figs. 11 and 12.

In Fig. 10, the mill sections *a* of the plate are shown hatched in one direction and the ribs *b* hatched in another direction to indicate the independence of such sections prior to their welding together at the joints *f*. Said mill sections of the plates are bent to predetermined curves, both longitudinally and transversely to mainly conform to the predetermined curves of the proposed structure, and are bent at top and bottom edges to fit the beams to which they are to be welded. The ribbed mill sections are constructed at the mill to conform to the longitudinal margins of the plate sections respectively, and said rib sections may be constructed at the mill to a novel cross section as shown in Fig. 11 for the double purpose of securing the greatest strength and stiffness for a given amount of metal, and the greatest convenience for fitting and welding the plate sections thereto.

The rib or girder beam consists of a rolled steel member with an appropriate weight, which, for a dam of this size, will be, say, 210 pounds per running foot. The appropriate curved bonding plates *a* for the armor face plate of a dam of the size indicated in Figs. 1 and 5–9, may be made of rolled steel one inch in thickness and 72 inches wide in the flat and curved as at *g*, to engage the entire curved surface *h*, of the web and base of the beam *d* as indicated at *f*, Fig. 10. The construction and dimensions of the beams may vary with the size and duty of structures respectively for which they are made.

The arrangement of the ribs *b* and concavities of the face plate on the down-stream side of the dam operates to avoid all necessity of a separate spill-way and of a water cushion. The upper face of each rib forms a baffle for the water flowing over the crest of the dam so that the fall of the water is broken at each rib line. Furthermore, the ribs overhang one another to form air spaces and channels 90 so that in addition to strengthening the down-stream face of the dam said ribs operate toward suction and aeration of the water. The concave surface of the plates, together with the overhanging ribs and action of the air superficial to the plates and below the ribs respectively, tend to give the impinging water a vortiginous motion causing the water to commingle with the air and otherwise dissipate so that the force of its impact is minimized or greatly reduced.

The face plates on both the up-stream side and the down-stream side are shown concaved; being in the form of a double arch.

The curved plates and ribs in combination with the core form a multiple arch face in which each plate with its abutting ribs each form an arched member that not only constitute an arch member. The strakes curve upward against the gravity load but inwardly toward the middle of the core; thus, under all conditions, tending to preserve the integrity of the masonry or filled core.

The effect of movements due to temperature stresses, whether from a rise or drop in temperature, will result, in either event, to cause the metal to press against the face of the core and not to separate from it. This tends to maintain the rigidity and strength of the dam under all possible conditions.

The splice bars *e* for use at the weld joints between the ends of the plates *c* are preferably constructed of anchor form as detailed in Figs. 10, 16, 17 and 18. The web 4 and foot 5 of the anchor conform, substantially, to the web and base of the girder beam sections; being substantially of fish tail form in cross-section.

The head or outer rib of the anchor splice bar is constructed with outer and lateral ribs 6, 7, 8, forming channels 9, in which the edges 10 of the plate-like mill-sections *c* will be laid preparatory to welding. The welding of the plates to ribs and splice bars for any strake is effected in the usual manner of electric or flame welding before the concrete is poured at that height. The anchor 5 terminates short of the ends of the splice bar to give clearance at 11 for the bodies of the girder beams *b*.

Figure 14:
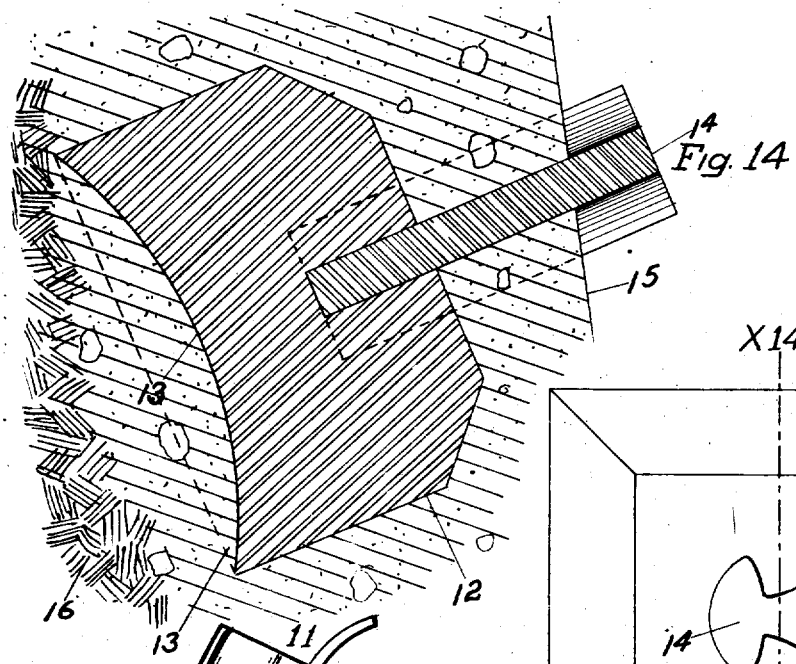
Fig. 14 is a vertical section on line $x^{14}$, Fig. 15 of one of the footings in situ ready to have a mill-length girder beam-like section welded thereonto for constructing one of the ribs.
Figure 15:
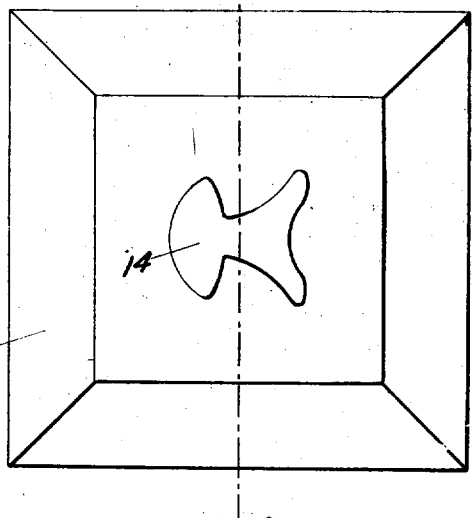
Fig. 15 is a view of the front face of one of the footings with stub in place.

The ribs or girders are supported in place by footings 12 shown in detail in Figs. 14 and 15, said footings comprising blocks of cast or forged steel, having concavities 13 at the back, and rib, or girder-beam stubs 14 fixed in and projecting from the front. These footings are embedded in cement 15 in the channeled or otherwise prepared walls 16, of the chasm that is to be dammed, and the ribs or girder beams are attached thereto in any suitable manner as by welding, thus making the metal footing 12 and beam stub 14 integral with one another.

In practice, preparatory to final construction, the footings, the mill sections of ribs and plates and the necessary broken-rock or other aggregates and hydraulic cement are assembled at the dam site, and the bed and side walls of the chasm or channel across which the structure is to be built is prepared to an appropriate contour for the reception of the foundation and side footings of the dam. The penstocks for an outlet omitted from the views for the convenience of the draftsman and to avoid confusion of lines, may then be placed in position immediately upon the foundation or at any height desired.

The construction of the dam proper may then be carried on as follows:—

The up-stream and down-stream armor will be carried upward at least one strake above the core which is poured and tamped in place between the plates so as to conform to and be in contact with the inner surface of the steel.

The steel work is carried up as follows: The footings are anchored to the inside of the canyon along a predetermined contour, preferably to conform to the spiral mentioned above. The footings 12 respectively containing the stubs of the girder beams, are anchored firmly in place along the predetermined contour, and by welding the connecting rib mill sections *d* and the footing stubs of the beams together, they are made into continuous longitudinal members, preferably rising toward the middle, but of the same general elevation at the wall terminals. The curved plates or bonding members *c* are then placed in position on the upper side of the girder *b* and together with the splice bars, *e* are welded into final position. Upon the top edge of the plate panel thus formed, another course of beam sections thus formed is laid and welded to the footing stubs and together, and to the supporting bonding plates and anchor splice bars; and in this way the construction is carried up one strake in advance of the filling or core, as stated above. The steel members, previously having been formed to the specified curves, will make the arch design as shown in the drawing springing both upwardly toward the crest of the dam and inwardly toward the middle of the filling or core of the dam. In this way, when concrete aggregate is used, the steel members permanently make required forms for the concrete without the expense of any temporary supports, scaffolding or forms.

It is understood that some of the advantages of constructing the dam with a cross-sectional contour, conforming to the formula stated are as follows:

It develops the required strength and friction area that would be shown by an arch of several times its weight built between parallel segments.

The weight of the steel armor is disposed so as to protect the base or toe from rupture by upward pressure or percolating water.

In the instance shown in Fig. 1 it may be assumed that the dam is either 1000 or 1200 feet in height, and that in the latter case it has had the contour of its vertical cross-section plotted with a unit of measurement equal to 12/10 of a foot so that there are 1000 units of measurement in the distance from base to crest of dam. The purpose of changing the length of the unit of measurement according to the increased height is to avoid bringing the upper portion of a dam of great height into too close conformity to a vertical.

It is noted that by the application of the novel principles of construction herein set forth, the thinnest part of the dam is at the middle of the dam crest, and that such middle is the unitary crown of a double reverse arch. In any instance, however, before deflection could occur in the dam shown, both the concrete core and the concave armor plate on the face receding from the pressure source would have to be sheared. In addition to this the webs of the splice bars would have to be sheared.

Another feature of strength resides in the multiple arch construction developed by the arrangement of curved panels as set forth.

A further advantage arises from the concave face dam construction in that the hydrostatic pressure of the impounded water is radial to the concavity and consequently two-thirds, more or less, of the pressure is directed towards the walls and floor of the chasm. By reason of the double concave construction shown in Fig. 4 only the upper middle third works as an arch, and the extreme thirds at both ends and a measurable portion at the bottom work as abutments. That is, the thrust of the pressure exerted on the portions of the dam adjacent each side and for a considerable distance across the chasm from each side, is on lines which will project into the side walls of the chasm, consequently only the middle span of the dam is unsupported directly by said side-walls. See Figs. 4 and 5. The portions supported by the sides may be considered abutments and the portion not so supported may be called the arch proper.

By reference to Figs. 5 and 6, it will be seen that the arch proper extends less than one-third the length of the dam, as indicated by the chord C, the arch resting on the abutments D.

The dam is thus composed of a combination of arch and abutments which affords greater strength for a given volume or mass of material than possible with former constructions.

It is thus seen that the invention is a broad departure from former practice as to the various principles, parts and combinations of parts set forth, as well as in the completed structure, and that the invention may be applied in various forms within the judgment of the constructor; and that various features may be changed or omitted without departure from the invention in other respects, and therefore, I do not limit the invention to the specific details, although it includes the same.

By providing a composite stress-resisting structure in which the portion for resisting compression is reenforced externally by opposite seamless facings; and more particularly, by one or more seamless externally concave steel facings, said facings working in tension, I confine the compression resisting element, secure maximum strength, and avoid all likelihood of breaking, shattering or weakening the reenforced portion of the structure by any force insufficient to rend the reenforcing portion.

I have also provided for maximized frictional and anti-seepage contact by introducing the inverted arch into dam construction, whereby such effect is maximized for a given mass.

It is also understood that though the central upper member of the dam is shown as a reverse arch, it may be differently constructed, and that I have only illustrated the invention in that form which I at present deem most desirable for the purpose of constructing a dam.

I claim.

1. A structural unit having a face, cross sectional contours of which substantially conform, respectively, from abutment to mid-plane along the crest and also from base to crest of such unit, to a formula in which the abscissa is equal to the two-thirds power of the ordinate with the parts of greatest curvature at the base and at the abutments of said unit.

2. A structural unit having a corrugated face, cross sectional contours of which from base to crest and from the abutments to middle plane along the crest between the abutments conform generally to a formula in which the abscissa is equal to the two-thirds power of the ordinate with the parts of greatest curvature at the base and at the abutments of said unit.

3. A structural unit comprising a core and an inherently unitary metal face, contours of which face substantially conform respectively, from base to crest and from abutment to mid-plane along the crest to a formula in which the abscissa from base toward the crest or from abutment toward middle plane along the crest is equal to the two-thirds power of the ordinate with the parts of greatest curvature at the base and at the abutments of said unit.

4. A structural unit comprising a core and an inherently unitary corrugated face, contours of which face substantially conform respectively from base to crest and from abutment toward mid-plane along the crest, to a formula in which the abscissa is equal to the two-thirds power of the ordinate with the parts of greatest curvature at the base and at the abutments of said unit.

5. A dam having up-stream and down-stream faces that conform substantially, in vertical cross section from base to crest, to a formula in which the abscissa is equal to two-thirds power of the ordinate with the point of maximum curvature at the base of said unit.

6. A dam having a transversely corrugated concave downstream face, the corrugations being overhanging ribs forming air spaces beneath the ribs, respectively.

7. A dam comprising a core and a vertically and transversely concave metal face sustaining and externally reinforcing said core.

8. A dam having its down-stream face curved away from the crest and formed with alternate ribs and concavities arranged transversely of the channel in which the dam is erected for the purpose of forming baffles and air cushions to dissipate the falling water after it has passed over the crest and before it reaches the foot of the dam.

9. A dam having laterally concaved up-stream and down-stream faces comprising a core terminating in enlarged lateral abutments and metallic face-plates made up of ribs and vertically concaved inter-rib plate-like members externally reenforcing said core.

10. A dam comprising a concrete core and having a laterally concaved up-stream and down-stream faces, terminating in enlarged lateral abutments, and metallic face-plates made up of ribs and vertically concaved inter-rib plate-like members surfacing and externally reenforcing said core.

11. A dam comprising a plate composed of arched ribs and plate-like members integrally united; said plate-like members being longitudinally curved and arranged to form grooves on one side and corrugations on the other side of the plate; and a core externally reenforced by said plate.

12. A dam comprising a core terminating in enlarged lateral abutments and having external metallic reenforcements, the said reenforcements comprising outwardly projecting ribs and vertically concaved inter-rib plate-like members.

13. A dam comprising a core terminating in enlarged lateral abutments and having external metallic reenforcements, the said reenforcements comprising a plurality of outwardly projecting ribs of the same size and vertically concave inter-rib plate-like members, the faces of said dam being curved from the top to the bottom thereof so that each of the projecting ribs will intercept the water falling over the said dam.

14. A dam having laterally concaved up-stream and down-stream faces, comprising a concrete core terminating in enlarged lateral abutments and metallic face-plates made up of outwardly projecting ribs and vertically concaved inter-rib plate-like members.

15. A dam having a concave face and ribs projecting from such face and inclined upwardly toward the middle of such face.

16. A dam having a concave face and ribs projecting from such face and inclined and arched upwardly toward the middle of such face.

17. A dam comprising a core having upstream and downstream faces oppositely curved longitudinally to form the dam with increasing thicknesses from the mid-plane toward the end abutments thereof, said upstream and downstream faces being curved inwardly throughout from base to crest, and a metal face sustaining and externally reenforcing the upstream and downstream faces of said core.

JAMES HENRY LEVERING.